(12) United States Patent
Wang et al.

(10) Patent No.: US 12,182,370 B2
(45) Date of Patent: Dec. 31, 2024

(54) TOUCH MODULE COMPRISING TOUCH UNITS, MANUFACTURING METHOD THEREOF AND TOUCH DISPLAY DEVICE HAVING THE TOUCH MODULE

(71) Applicant: BOE TECHNOLOGY GROUP CO., LTD., Beijing (CN)

(72) Inventors: Xinxing Wang, Beijing (CN); Jaegeon You, Beijing (CN); Xuefei Sun, Beijing (CN); Liyan Liu, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 362 days.

(21) Appl. No.: 17/607,622

(22) PCT Filed: Jan. 28, 2021

(86) PCT No.: PCT/CN2021/074219
§ 371 (c)(1),
(2) Date: Oct. 29, 2021

(87) PCT Pub. No.: WO2022/160200
PCT Pub. Date: Aug. 4, 2022

(65) Prior Publication Data
US 2023/0341983 A1  Oct. 26, 2023

(51) Int. Cl.
*G06F 3/044* (2006.01)
(52) U.S. Cl.
CPC .. *G06F 3/0446* (2019.05); *G06F 2203/04103* (2013.01); *G06F 2203/04111* (2013.01); *G06F 2203/04112* (2013.01)

(58) Field of Classification Search
CPC ......... G06F 3/0446; G06F 2203/04103; G06F 2203/04111; G06F 2203/04112
See application file for complete search history.

(56) References Cited

U.S. PATENT DOCUMENTS

| 2006/0232559 | A1 |   | 10/2006 | Chien et al. |  |
| 2016/0282976 | A1 | * | 9/2016 | Yang | G06F 3/0412 |
| 2017/0108975 | A1 | * | 4/2017 | Zhang | G06F 3/0446 |

(Continued)

FOREIGN PATENT DOCUMENTS

| CN | 103246409 A | 8/2013 |
| CN | 107085476 A | 8/2017 |

(Continued)

*Primary Examiner* — Lisa S Landis
(74) *Attorney, Agent, or Firm* — Myers Bigel, P.A.

(57) ABSTRACT

The present disclosure provides a touch module, a manufacturing method thereof, and a touch display device. The touch module includes: a base substrate; an array of touch units arranged on the base substrate, each touch unit including a first touch electrode extending along a first direction and two second touch electrodes arranged on two sides of the first touch electrode along a second direction, the first direction and the second direction intersecting each other; wherein, the touch unit further includes: a bridging region between the two second touch electrodes, a boundary region between the first touch electrode and each of the second touch electrodes, and a main body region located inside at least one of the first touch electrode and the second touch electrodes. The bridging region, the boundary region and the main body region all include cutting openings.

20 Claims, 15 Drawing Sheets

(56) References Cited

U.S. PATENT DOCUMENTS

| 2017/0212629 | A1 | 7/2017 | Cho et al. |
| 2019/0064967 | A1 | 2/2019 | He et al. |
| 2021/0004124 | A1 | 1/2021 | Park |

FOREIGN PATENT DOCUMENTS

| CN | 107390943 | A | 11/2017 |
| CN | 107479756 | A | 12/2017 |
| CN | 108614652 | A | 10/2018 |
| CN | 112181192 | A | 1/2021 |

* cited by examiner

TOUCH MODULE COMPRISING TOUCH UNITS, MANUFACTURING METHOD THEREOF AND TOUCH DISPLAY DEVICE HAVING THE TOUCH MODULE

RELATED APPLICATIONS

The present application is a 35 U.S.C. 371 national stage application of PCT International Application No. PCT/CN2021/074219, filed on Jan. 28, 2021, which claims the benefit of PCT International Application No. PCT/CN2021/074219, filed on Jan. 28, 2021, the entire disclosures of which are incorporated herein by reference.

TECHNICAL FIELD

The present disclosure relates to the field of display technologies, especially to a touch module, a manufacturing method thereof, and a touch display device.

BACKGROUND

OLED (Organic Light-Emitting Diode) display devices have advantages of being lighter and thinner, having good flexibility, high color gamut, wide field of view, fast response speed, low power consumption and high resolution, and so on, which have become a research hotspot in the display field in recent years. An On Cell touch panel is one of the key technologies for flexible OLED display screens to reduce thickness and improve flexibility. Compared with an ITO transparent electrode, the driving electrode (Tx) and the sensing electrode (Rx) in a touch module employ a metal mesh electrode material, which is advantaged by low resistance, lightness and thinness, high sensitivity, and so on.

SUMMARY

The present disclosure provides a touch module, a manufacturing method thereof, and a touch display device. In each touch sensing unit, the bridging region, the boundary region and the main body region all include cutting openings, which eliminate the Mura phenomenon (or moiré phenomenon) caused by the bridging region and the boundary region.

According to an aspect of the present disclosure, there is provided a touch module. The touch module comprises: a base substrate; an array of touch units arranged on the base substrate, each touch unit comprising a first touch electrode extending along a first direction and two second touch electrodes arranged on two sides of the first touch electrode along a second direction, the first direction and the second direction intersecting each other; wherein the touch unit further comprises: a bridging region between the two second touch electrodes, a boundary region between the first touch electrode and each of the second touch electrodes, and a main body region located inside at least one of the first touch electrode and the second touch electrodes; the bridging region, the boundary region and the body region all comprise cutting openings.

Optionally, in some embodiments, the first touch electrode and the second touch electrodes each comprises a metal mesh; the cutting openings in the bridging region, the boundary region and the body region have substantially the same distribution density.

Optionally, in some embodiments, a distribution density of the cutting openings in the bridging region is approximately 0.9 to 1.1 times a distribution density of the cutting openings in the main body region.

Optionally, in some embodiments, a ratio of an area of the bridging region to an area of the touch unit is in a range of approximately 1/10000 to 1/500.

Optionally, in some embodiments, a ratio of a number of sub-pixels covered by the bridging region to a number of sub-pixels covered by the touch unit in a range of approximately $3\times10^{-4}$~$4\times10^{-3}$.

Optionally, in some embodiments, a first dimension of the bridging region in the first direction is larger than a second dimension of the bridging region in the second direction.

Optionally, in some embodiments, a ratio of the second dimension to the first dimension is in a range of about 0.3 to 1.

According to another aspect of the present disclosure, there is provided a touch display device. The touch display device comprises a display panel and the touch module described in any of the foregoing embodiments, the touch module being arranged on a light exit surface of the display panel.

Optionally, in some embodiments, the first touch electrode and the second touch electrodes each comprises a metal mesh; the cutting openings in the bridging region, the boundary region and the main body region have substantially the same distribution density.

Optionally, in some embodiments, a distribution density of the cutting openings in the bridging region is approximately 0.9 to 1.1 times a distribution density of the cutting openings in the main body region.

Optionally, in some embodiments, a ratio of an area of the bridging region to an area of the touch unit is in a range of approximately 1/10000 to 1/500.

Optionally, in some embodiments, a ratio of a number of sub-pixels covered by the bridging region to a number of sub-pixels covered by the touch unit in a range of approximately $3\times10^{-4}$~$4\times10^{-3}$.

Optionally, in some embodiments, a first dimension of the bridging region in a first direction is larger than a second dimension of the bridging region in a second direction.

Optionally, in some embodiments, a ratio of the second dimension to the first dimension is in a range of about 0.3 to 1.

According to a further aspect of the present disclosure, there is provided a manufacturing method of a touch module. The method comprises: providing a base substrate; arranging an array of touch units on the base substrate, each touch unit comprising a first touch electrode extending along a first direction and two second touch electrodes arranged on two sides of the first touch electrode along a second direction, the first direction and the second direction intersecting each other; the touch unit further comprising: a bridging region between the two second touch electrodes, a boundary region between the first touch electrode and each of the second touch electrodes, and a main body region located inside at least one of the first touch electrode and the second touch electrodes; and forming cutting openings in the bridging region, the boundary region and the main body region.

BRIEF DESCRIPTION OF THE DRAWINGS

In order to more clearly illustrate the technical solutions in embodiments of the disclosure or in the prior art, the appended drawings needed to be used in the description of the embodiments or the prior art will be introduced briefly in the following. Obviously, the drawings in the following description are only some embodiments of the disclosure, and for those of ordinary skills in the art, other drawings may be obtained according to these drawings under the premise of not paying out creative work.

DETAILED DESCRIPTION

In the following, the technical solutions in embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skills in the art under the premise of not paying out creative work pertain to the protection scope of the disclosure.

The present disclosure provides a touch module, a manufacturing method thereof, and a touch display device. In each touch sensing unit, the bridging region, the boundary region and the main body region all include cutting openings, which eliminates the Mura phenomenon (or moiré phenomenon) caused by the bridging region and the boundary region.

The inventor found that, during the process of manufacturing a touch display device, when the touch module is superimposed on the display module such as an OLED backplate, the OLED touch display device has metal meshes with different patterns, which will lead to an optical Mura phenomenon (for example, dot Mura, line Mura, block Mura, etc. in the dark state, and differences in brightness at different azimuths in the bright state).

Figure 1:
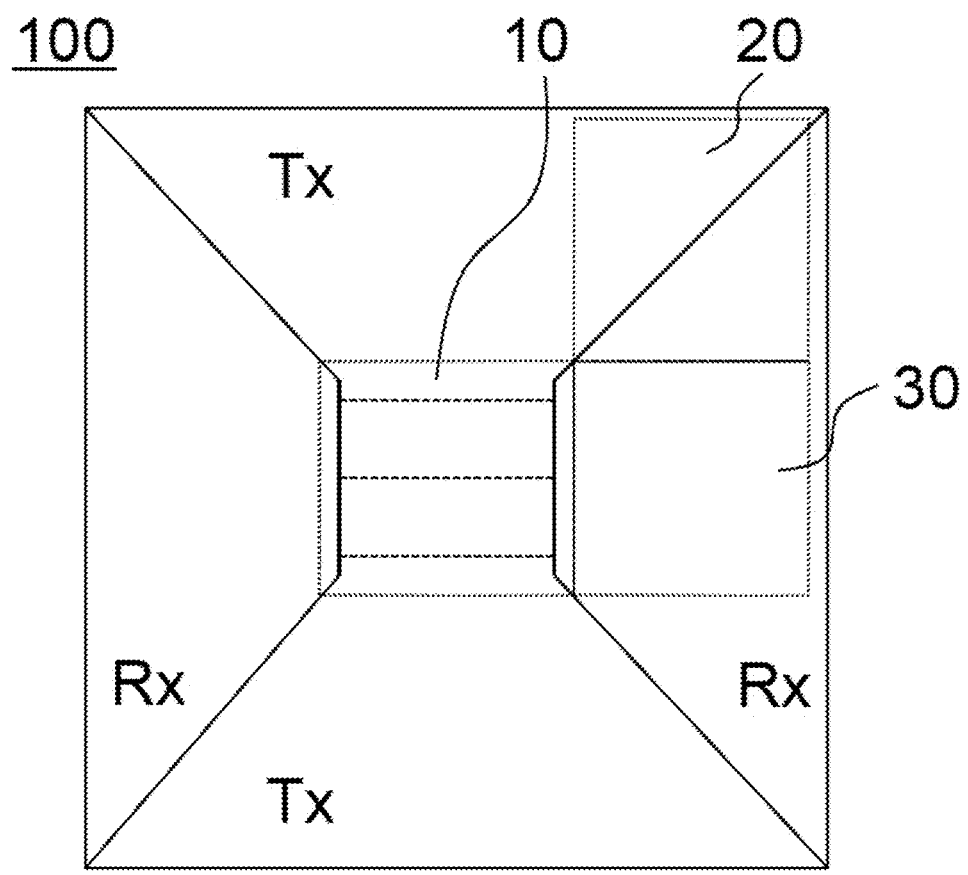
FIG. 1 illustrates the basic structure of a touch unit.
Figure 2:
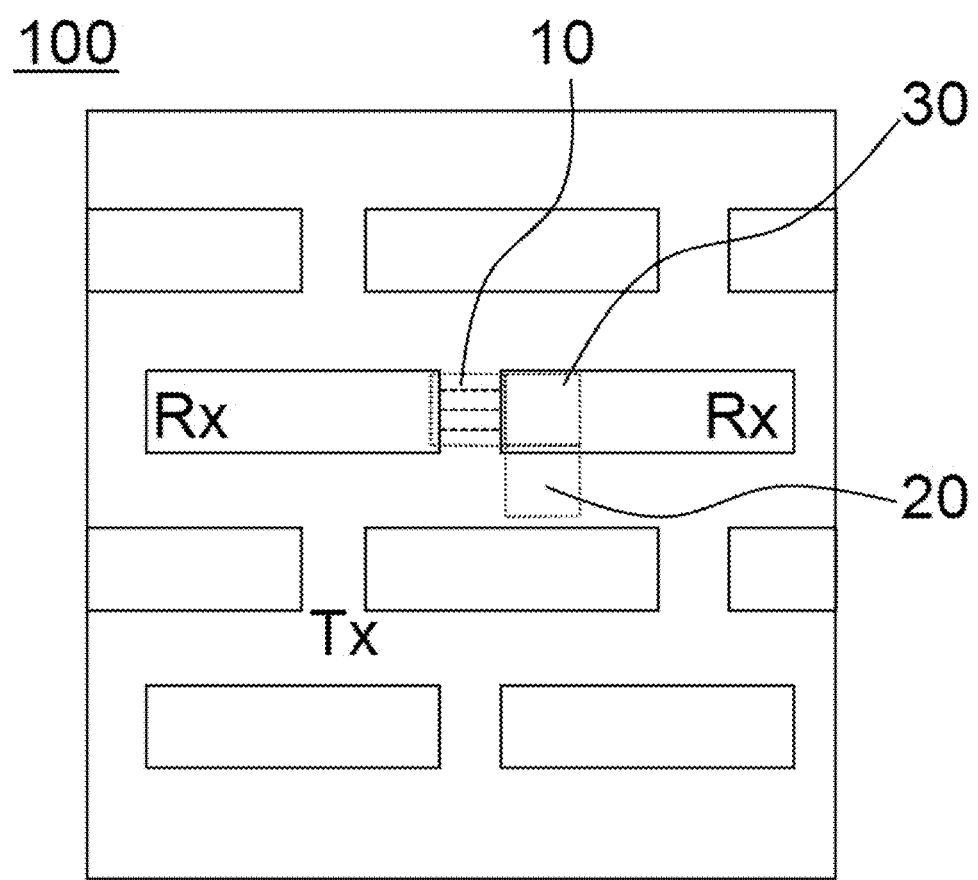
FIG. 2 illustrates the basic structure of another touch unit.

A touch unit is generally composed of two adjacent transmitting electrode patterns and two adjacent sensing electrode patterns, wherein the transmitting electrode patterns and the sensing electrode patterns substantially occupy half of the area. As shown in FIG. 1 and FIG. 2, in a touch unit 100 of the touch module, the bridging position of a transmitting electrode (Tx) or a sensing electrode (Rx) is defined as a bridging region 10, the boundary between the transmitting electrode and the sensing electrode is defined as a boundary region 20, and the remaining region is a main body region 30 of the transmitting electrode or the sensing electrode. If there are deficiencies in the bridging distance of the bridging region 10 and the pattern design of the metal mesh, they will cause serious dot or block Mura.

In the touch unit 100 shown in FIG. 1 and FIG. 2, the bridging region is a portion denoted by a dashed frame 10, which is composed of a Tx connection portion and an Rx connection portion. The Tx connection portion connects adjacent transmitting electrode patterns (Tx) inside the touch unit 100, and the Rx connection portion connects adjacent sensing electrode patterns (Rx) inside the touch unit 100. The Tx connection portion and the Rx connection portion constitute a laminated structure.

Figure 4:
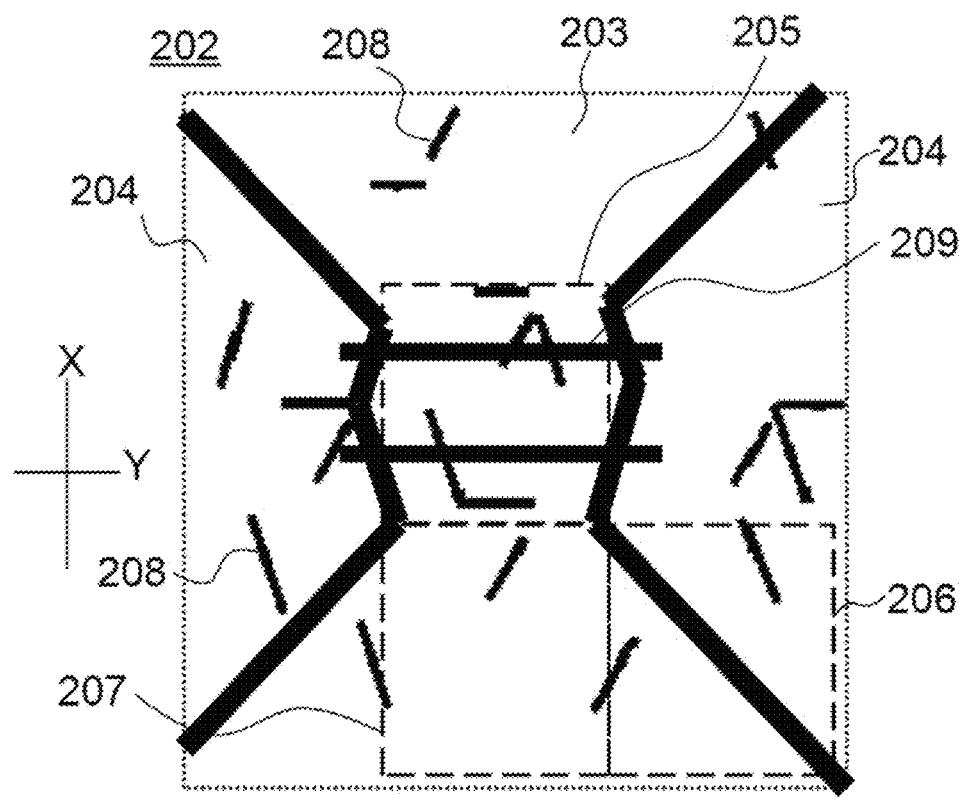
FIG. 4 illustrates a schematic structural view of a touch unit according to an embodiment of the present disclosure.
Figure 5:
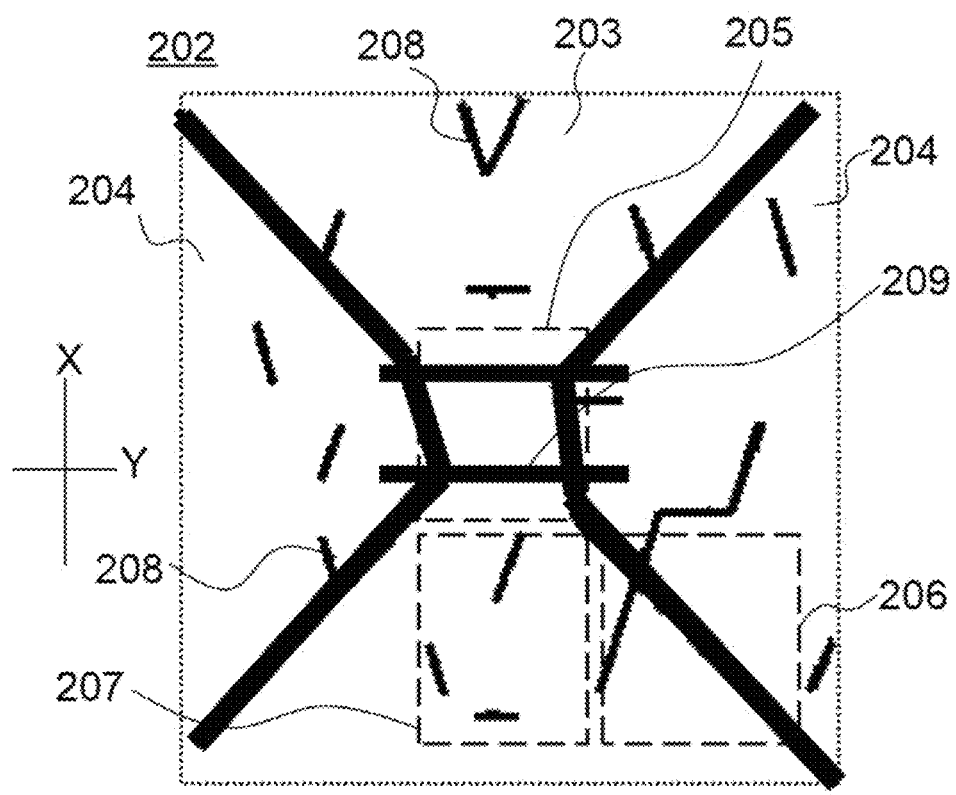
FIG. 5 illustrates a schematic structural view of a touch unit according to another embodiment of the present disclosure.
Figure 6A:
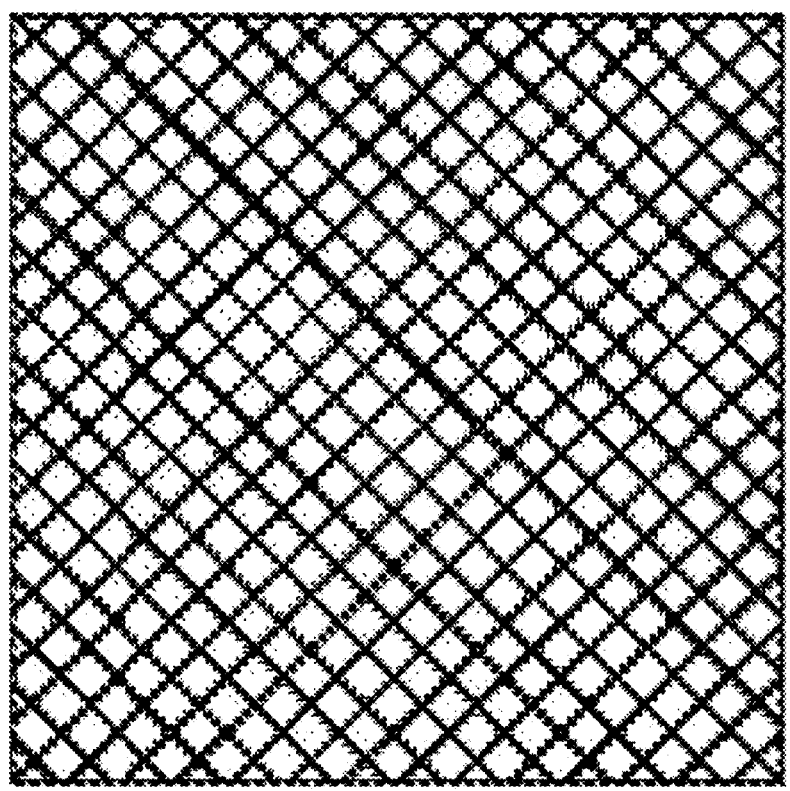
FIGS. 6A-6E illustrate schematic structural views of metal meshes.
Figure 6B:
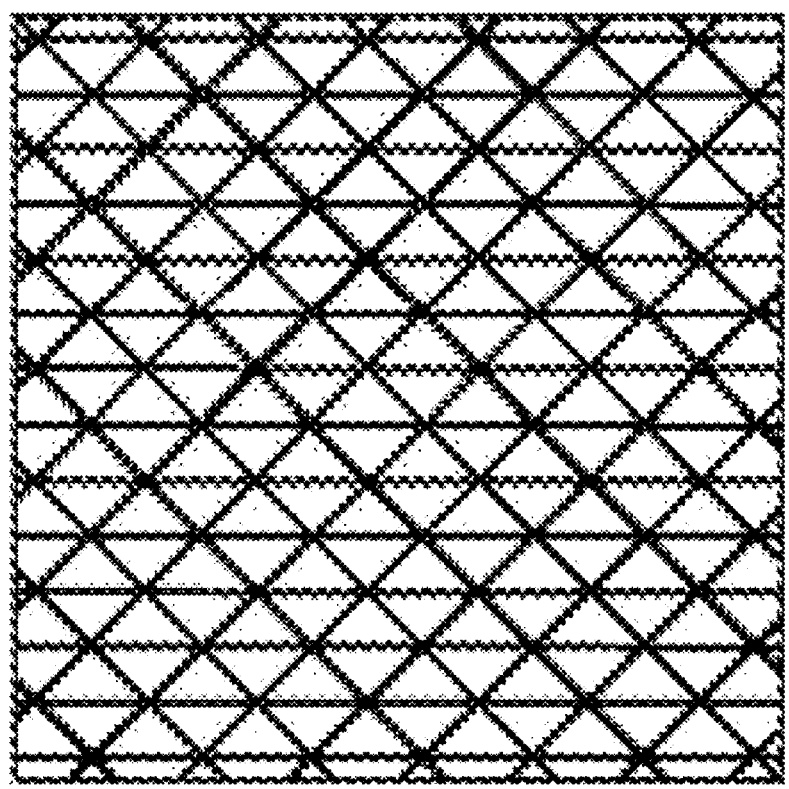
Figure 6C:
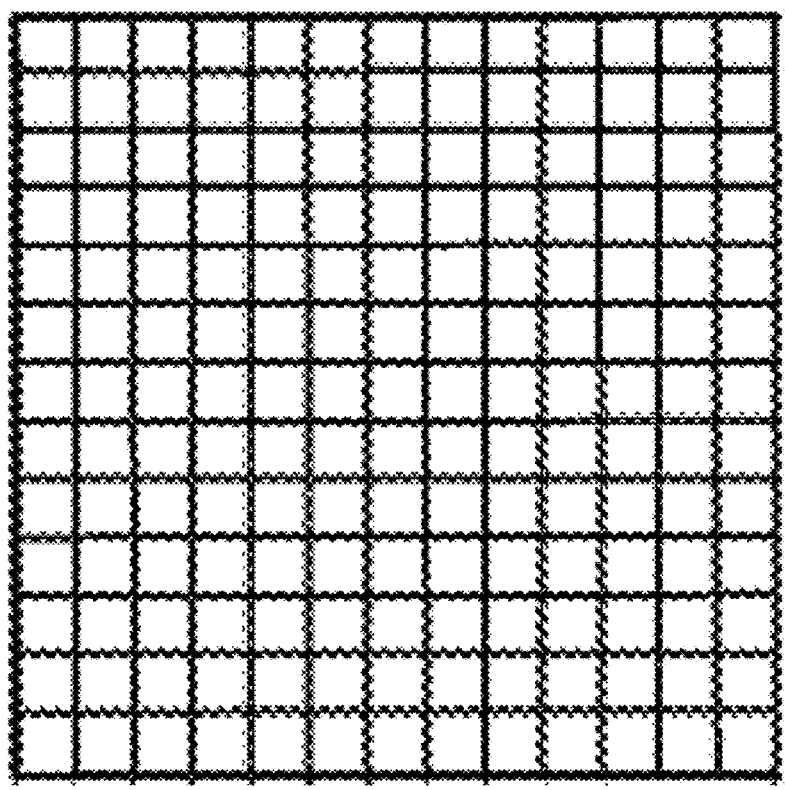
Figure 6D:
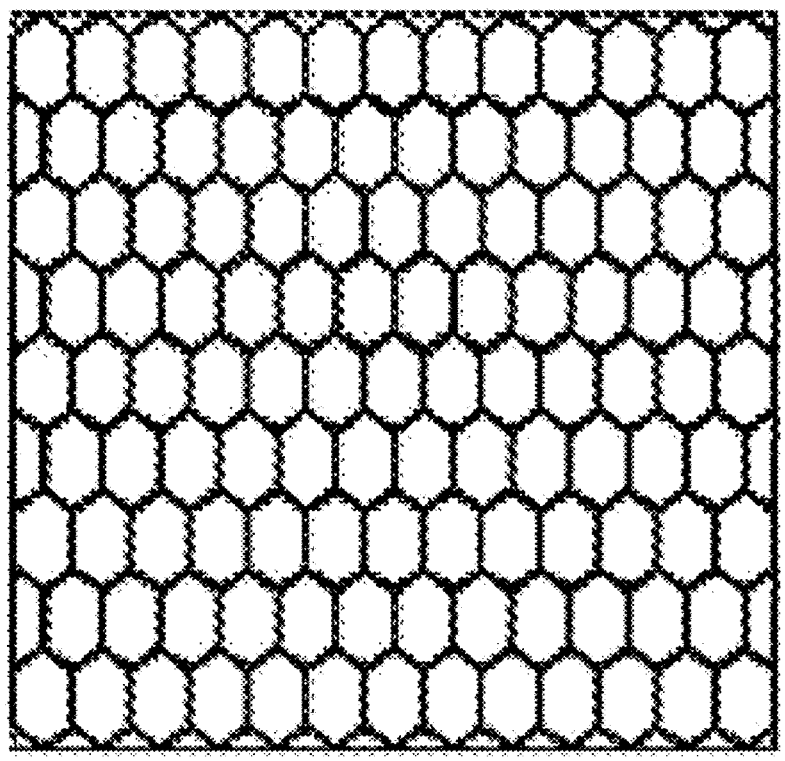
Figure 6E:
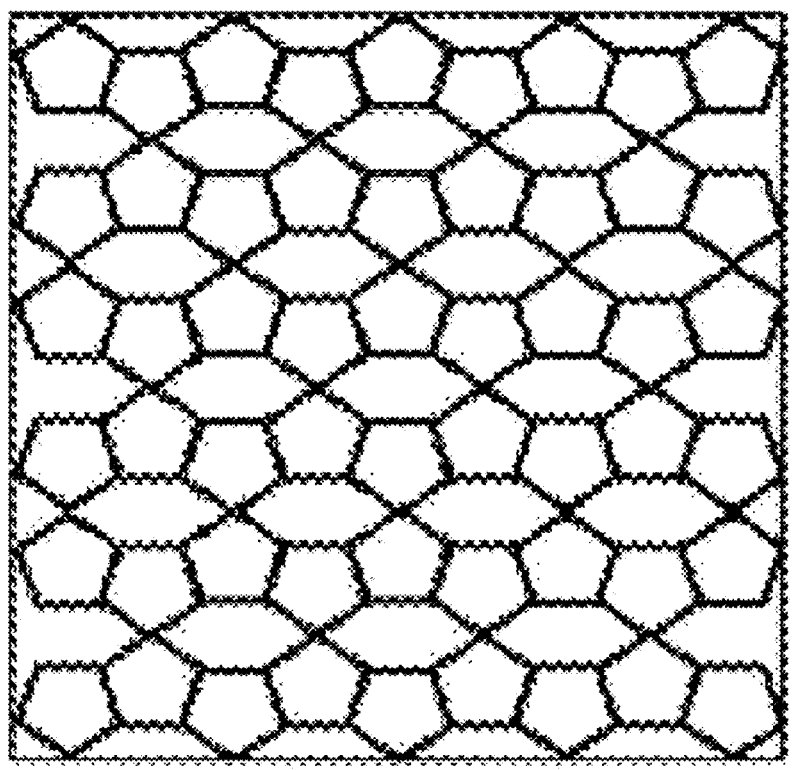
Figure 9:
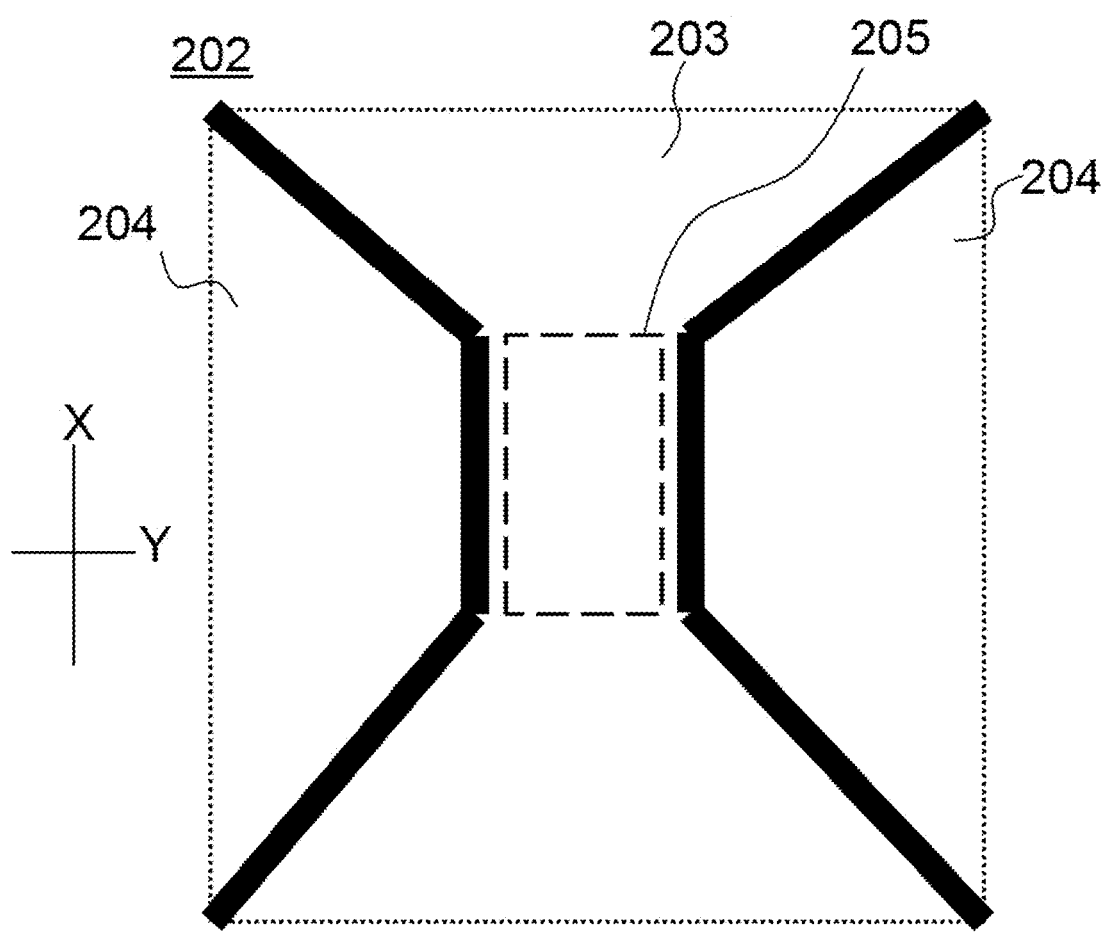
FIG. 9 illustrates a schematic view of a bridging region of a touch unit according to an embodiment of the present disclosure.

In a touch unit 202 shown in FIG. 4 and FIG. 5, the bridging region is a portion denoted by a dashed frame 205, which is composed of a connection portion of a first touch electrode 203 and a connection portion of a second touch electrode 204. The connection portion of the second touch electrode 204 may be a bridge 209 as shown in FIG. 9. The connection portion of the first touch electrode 203 and the bridge 209 constitute a laminated structure.

In some embodiments, the connection portion of the first touch electrode 203 in the bridging region may include one or more conductive patterns, and the connection portion (for example, the bridge 209) of the second touch electrode 204 in the bridging region may also include one or more conductive patterns.

Figure 3:
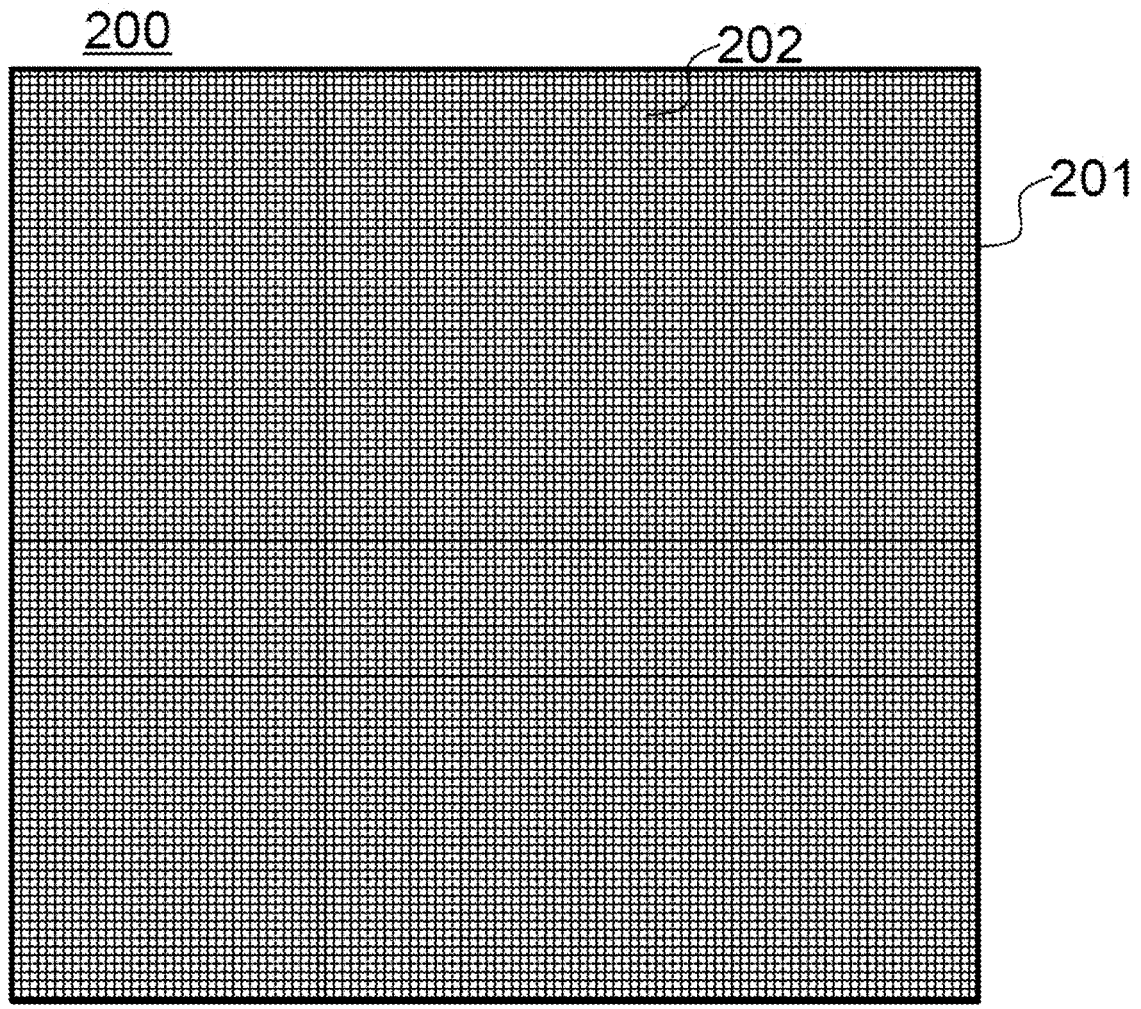
FIG. 3 illustrates a schematic structural view of a touch module according to an embodiment of the present disclosure.

According to an aspect of the present disclosure, there is provided a touch module. FIG. 3 illustrates a schematic structural view of a touch module according to an embodiment of the present disclosure. As shown in FIG. 3, a touch module 200 comprises: a base substrate 201; an array of touch units 202 arranged on the base substrate 201. As shown in FIG. 4 and FIG. 5, the touch unit 202 comprises a first touch electrode 203 extending along a first direction X and two second touch electrodes 203 arranged on two sides of the first touch electrode 203 along a second direction Y, the first direction X and the second direction Y intersecting each other. The touch unit 202 further comprises: a bridging region 205 located between the two second touch electrodes 204, a boundary region 206 located between the first touch electrode 203 and each of the second touch electrodes 204, and a main body region 207 located inside at least one of the first touch electrode 203 and the second touch electrodes 204. The bridging region 205, the boundary region 206 and the main body region 207 all include cutting openings 208.

According to an embodiment of the present disclosure, in each touch sensing unit, the bridging region, the boundary region and the main body region all include cutting openings. Therefore, when the touch module is used in a touch display device, the Mura phenomenon (or moiré phenomenon) caused by the bridging region, the boundary region and the main body region is eliminated.

Therefore, the present disclosure further provides a design method for an FMLOC (Flexible Multi-Layer On Cell) structure. The bridging region, the boundary region and the main body region of Tx and Rx in a complete FMLOC cycle are designed, so that in each touch sensing unit, the bridging region, the boundary region and the main body region all include cutting openings. As a result, an optimized design of the touch unit can be obtained, in which Mura resulting from superimposition of the FMLOC and the OLED is significantly alleviated.

The present disclosure may also be applied to other types of multilayer On Cell structures and devices, and is particularly suitable for a metal mesh On Cell touch structure. The touch unit of a metal mesh On Cell touch structure may be made of, for example, a layered metal mesh as shown in FIGS. 6A to 6E, wherein the metal mesh is formed by a mesh pattern that is repeatedly arranged. The On Cell touch structure is arranged on a display panel, so the mesh pattern can be selected according to a specific arrangement of sub-pixel units in the display panel.

In the embodiment of the present disclosure, the first touch electrode 203 may be a transmitting electrode (Tx), and the first touch electrode 203 may also be a sensing electrode (Rx). The second touch electrodes 204 may be sensing electrodes (Rx), and the second touch electrodes 204 may also be transmitting electrodes (Tx). For example, in an embodiment, the first touch electrode 203 is a transmitting electrode (Tx), and the second touch electrodes 204 are sensing electrodes (Rx). In another embodiment, the first touch electrode 203 is a sensing electrode (Rx), and the second touch electrodes 204 are transmitting electrodes (Tx).

Figure 7:
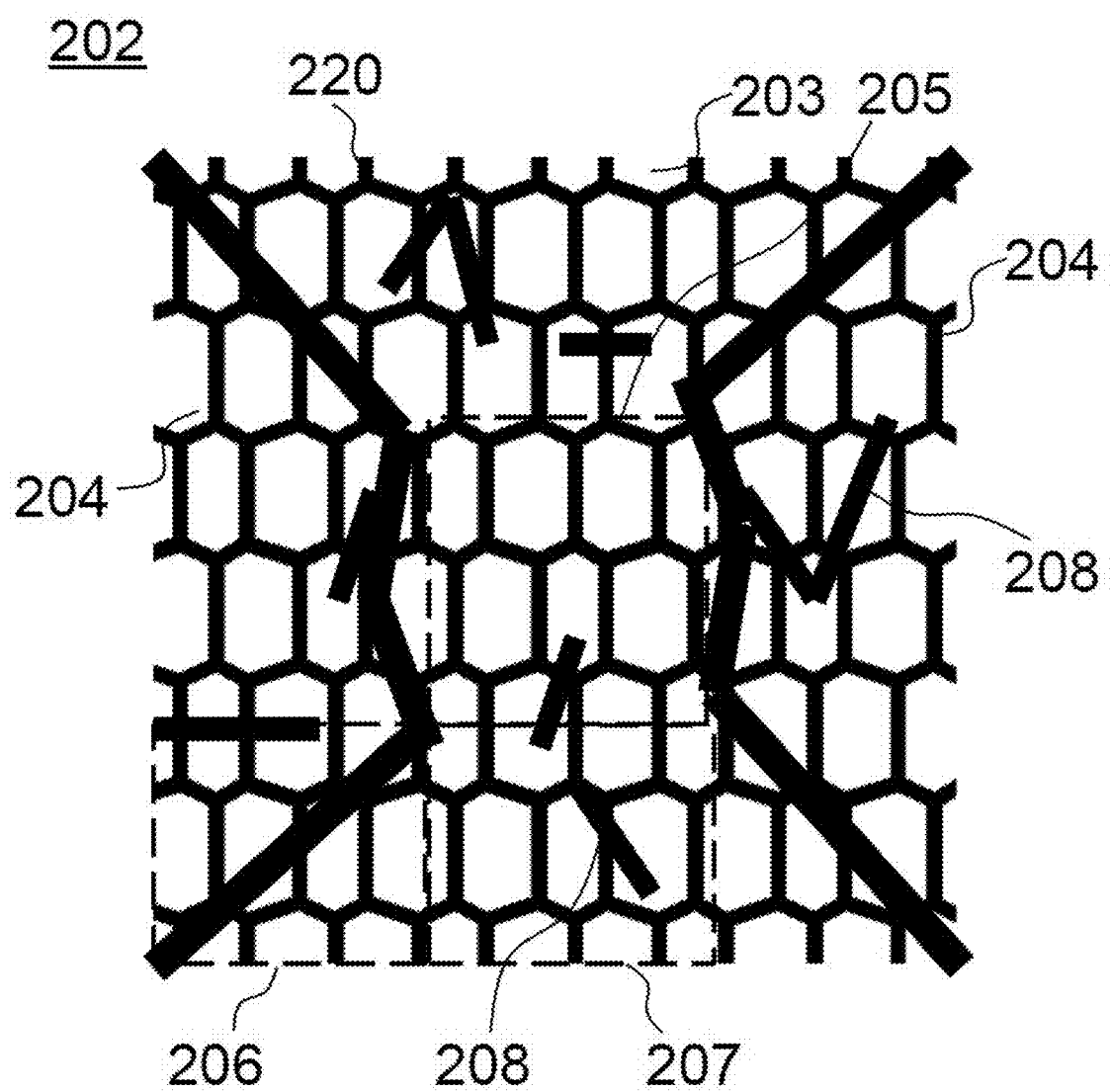
FIG. 7 illustrates a schematic structural view of a touch unit according to an embodiment of the present disclosure.
Figure 8:
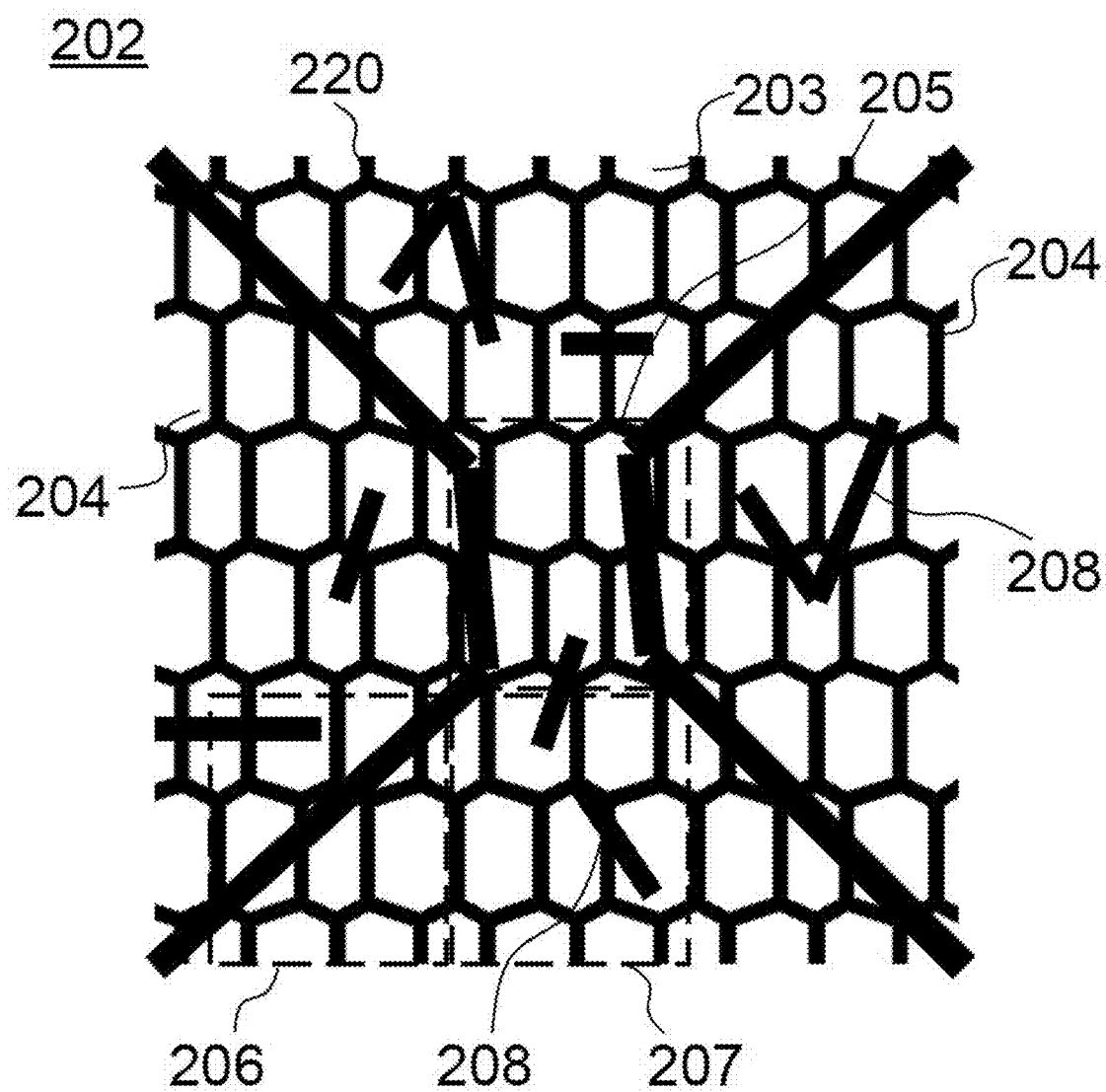
FIG. 8 illustrates a schematic structural view of a touch unit according to another embodiment of the present disclosure.

Optionally, in some embodiments, as shown in FIG. 7 and FIG. 8, the first touch electrode 203 and the second touch electrodes 204 each comprises a metal mesh 220. The cutting openings 208 in the bridging region 205, the boundary region 206 and the main body region 207 have substantially the same distribution density.

In the context of the present disclosure, the "distribution density" of the cutting openings in the metal mesh refers to a ratio of the number of cutting openings in a repeating unit to the number of mesh patterns in the repeating unit in a certain direction. For example, among 100 metal wires extending in a certain direction, 20 metal wires have fractures, so the "distribution density" of the cutting openings in this direction is 20%. In some embodiments, the "distribution densities" of the cutting openings in all directions are equal to each other.

Optionally, in some embodiments, the distribution density of the cutting openings in the bridging region is approximately 0.9 to 1.1 times the distribution density of the cutting openings in the main body region. "Approximately" refers to values within the allowable process error and measurement error range, and does not strictly define the limit.

In a specific implementation, the distribution density of the cutting openings in the main body region may be used as a reference, and the distribution density of the cutting openings in the bridging region is adjusted so that the regions have substantially the same distribution density of the cutting openings in all directions, which can further eliminate the Mura phenomenon.

Optionally, in some embodiments, the ratio of the area of the bridging region to the area of the touch unit is in the range of approximately 1/10000 to 1/500. In the context of the present disclosure, "approximately" refers to values within the allowable process error and measurement error range, and does not strictly define the limit.

In the touch unit, the dimension of the bridging region determines the dimension of the touch electrode. Thus, the design of the bridging region has an impact on the coupling capacitance between the touch electrodes. Specifically, the smaller the area of the bridging region is, the larger the coupling capacitance will be. However, if the area of the bridging region is too small, it will lead to an increase in resistance and an increase in touch sensitivity, thereby resulting in a crosstalk. Therefore, the present disclosure provides an area ratio of the bridging region with respect to the touch unit.

Optionally, in some embodiments, the ratio of the number of sub-pixels covered by the bridging region to the number of sub-pixels covered by the touch unit is in the range of about $3 \times 10^{-4}$ to $4 \times 10^{-3}$.

For example, the number of sub-pixels to which the touch unit corresponds is 135*90, and the number of sub-pixels to which the bridging region corresponds may be between 2*2 and 9*6.

Optionally, in some embodiments, as shown in FIG. 4 and FIG. 5, the first dimension of the bridging region 205 in the first direction X is larger than the second dimension of the bridging region 205 in the second direction Y.

As shown in FIG. 9, the bridging region 205 has an elongated shape. That is, for a given bridging region area, the aspect ratio of the bridging region is decreased. The aspect ratio is a ratio of the number of sub-pixels to which the distance between the two second touch electrodes 204 corresponds to the number of sub-pixels to which the bridging region corresponds in the second direction Y Those skilled in the art can understand that the edges of the first touch electrode and the second touch electrode may have a broken line shape, a stepped shape, a linear shape, a curved shape, an irregular shape, or the like.

Optionally, in some embodiments, the ratio of the second dimension to the first dimension is in the range of about 0.3 to 1.

Figure 10:
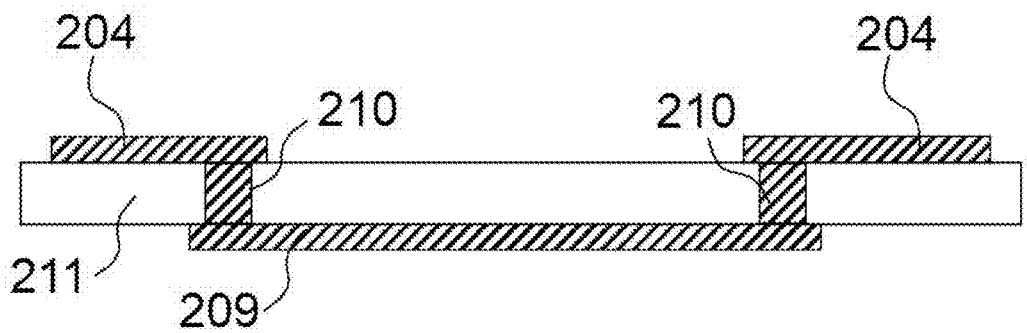
FIG. 10 illustrates a schematic structural view of a bridge of a touch unit according to an embodiment of the present disclosure.

FIG. 10 illustrates a schematic structural view of a bridge of a touch unit according to an embodiment of the present disclosure. In some embodiments, as shown in FIG. 10, the two second touch electrodes 204 are connected to each other via a via hole 210 and a bridge 209, and the via hole 210 penetrates an insulating layer (or a passivation layer) 211. Those skilled in the art can understand that the bridge 209 spans the bridging region, and the material of the bridge 209 may be a metal or a conductive metal oxide.

Figure 11:
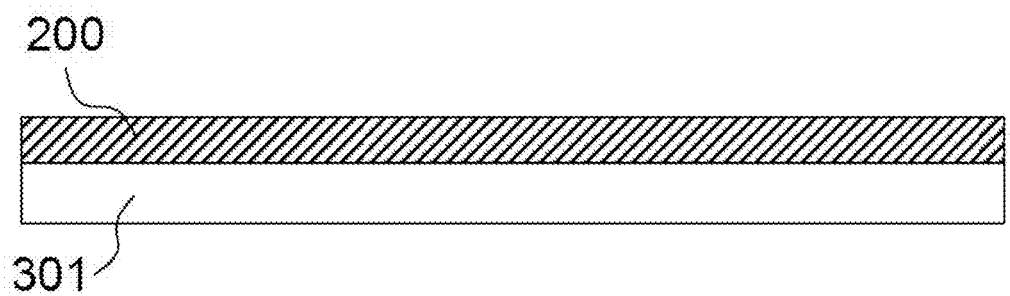
FIG. 11 illustrates a schematic structural view of a touch display device according to an embodiment of the present disclosure.

According to another aspect of the present disclosure, there is provided a touch display device. FIG. 11 illustrates a schematic structural view of a touch display device according to an embodiment of the present disclosure. As shown in FIG. 11, the touch display device 300 comprises a display panel 301 and the touch module 200 as described in any of the foregoing embodiments, and the touch module 200 is arranged on the light exit surface of the display panel 301.

The touch display device provided by the embodiment of the present disclosure has the same advantages as the abovementioned touch module, which will not be repeated here.

Optionally, in some embodiments, as shown in FIG. 7 and FIG. 8, the first touch electrode 203 and the second touch electrodes 204 each comprises a metal mesh 220. The cutting openings 208 in the bridging region 205, the boundary region 206 and the main body region 207 have substantially the same distribution density.

Optionally, in some embodiments, the distribution density of the cutting openings in the bridging region is approximately 0.9 to 1.1 times the distribution density of the cutting openings in the main body region.

In a specific implementation, the distribution density of the cutting openings in the main body region may be used as a reference, and the distribution density of the cutting openings in the bridging region is adjusted so that the regions have substantially the same distribution density of the cutting openings in all directions, which can further eliminate the Mura phenomenon.

Optionally, in some embodiments, the ratio of the area of the bridging region to the area of the touch unit is in the range of approximately 1/10000 to 1/500.

In the touch unit, the dimension of the bridging region determines the dimension of the touch electrode. Thus, the design of the bridging region has an impact on the coupling capacitance between the touch electrodes. Specifically, the smaller the area of the bridging region is, the larger the coupling capacitance will be. However, if the area of the bridging region is too small, it will lead to an increase in resistance and an increase in touch sensitivity, thereby resulting in a crosstalk. Therefore, the present disclosure provides an area ratio of the bridging region with respect to the touch unit.

Optionally, in some embodiments, the ratio of the number of sub-pixels covered by the bridging region to the number of sub-pixels covered by the touch unit is in the range of about $3 \times 10^{-4}$ to $4 \times 10^{-3}$.

For example, the number of sub-pixels to which the touch unit corresponds is 135*90, and the number of sub-pixels to which the bridging region corresponds may be between 2*2 and 9*6.

Optionally, in some embodiments, as shown in FIG. 4 and FIG. 5, the first dimension of the bridging region 205 in the first direction X is larger than the second dimension of the bridging region 205 in the second direction Y.

As shown in FIG. 9, the bridging region 205 has an elongated shape. That is, for a given bridging region area, the aspect ratio of the bridging region is decreased. The aspect ratio is the ratio of the number of sub-pixels to which the distance between the two second touch electrodes 204 corresponds to the number of sub-pixels to which the bridging region corresponds in the second direction Y Those skilled in the art can understand that the edges of the first touch electrode and the second touch electrode may have a broken line shape, a stepped shape, a linear shape, a curved shape, an irregular shape, or the like.

Optionally, in some embodiments, the ratio of the second dimension to the first dimension is in the range of about 0.3 to 1.

Figure 12:
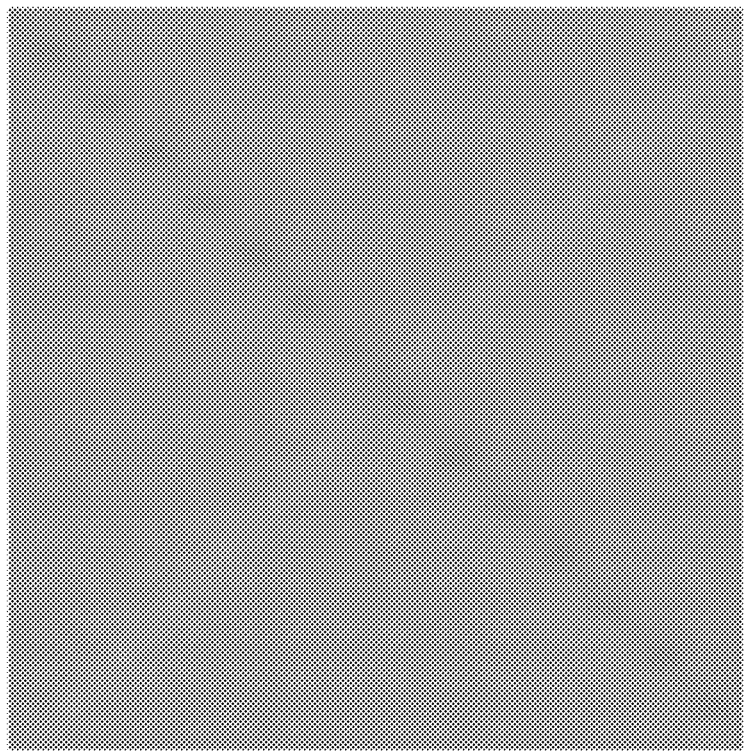
FIG. 12 illustrates an optical simulation result of the touch module according to an embodiment of the present disclosure.

Embodiments of the present disclosure further provide the capacitance, sensitivity, and optical simulation result of the touch unit. The capacitance obtained by the touch unit as shown in FIG. 7 is 0.56 pF, and the sensitivity is 4.56%. The capacitance obtained by the touch unit as shown in FIG. 8 is 0.505 pF, and the sensitivity is 5.02%. FIG. 12 illustrates an optical simulation result of a touch module composed of the touch units as shown in FIG. 7 and FIG. 8. It can be seen that with the touch module provided by the present disclosure, the Mura phenomenon is significantly suppressed.

Figure 13:
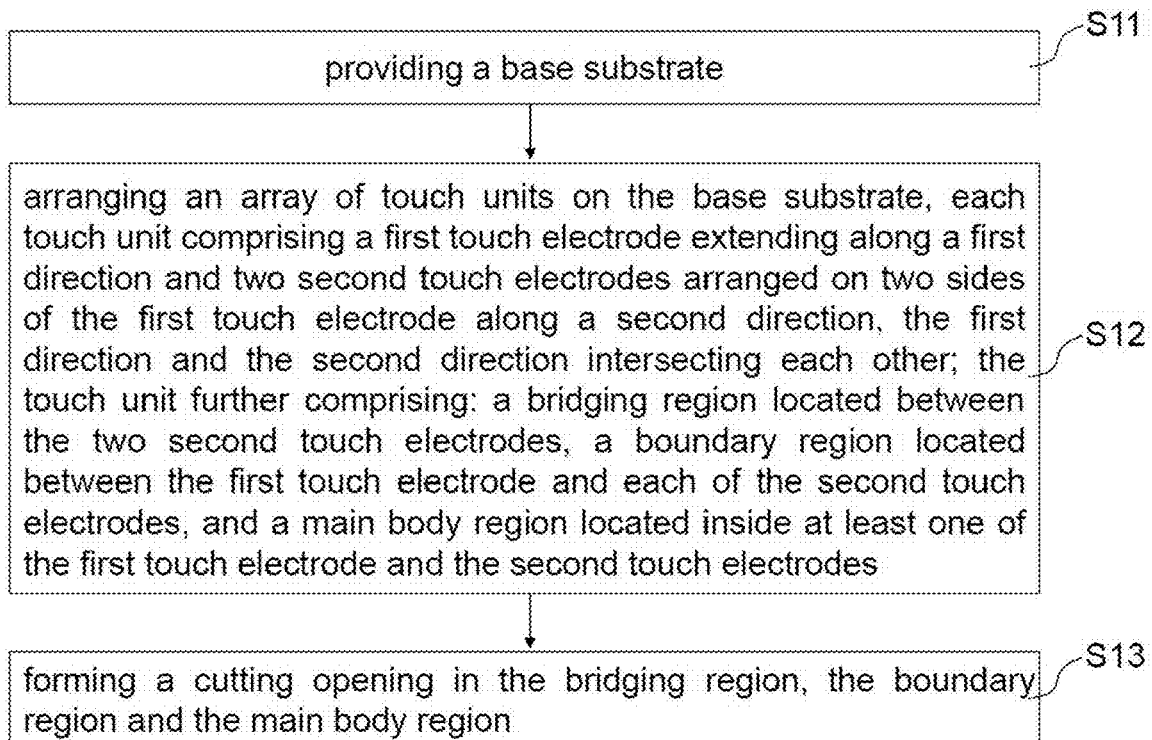
FIG. 13 illustrates a flow chart of a manufacturing method of a touch module according to an embodiment of the present disclosure.

According to a further aspect of the present disclosure, there is provided a manufacturing method of a touch module. FIG. 13 illustrates a flow chart of a manufacturing method of a touch module according to an embodiment of the present disclosure. The method comprises: S11 providing a base substrate; S12 arranging an array of touch units on the base substrate, each touch unit comprising a first touch electrode extending along a first direction and two second touch electrodes arranged on two sides of the first touch electrode along a second direction, the first direction and the second direction intersecting each other; the touch unit further comprising: a bridging region located between the two second touch electrodes, a boundary region located between the first touch electrode and each of the second touch electrodes, and a main body region located inside at least one of the first touch electrode and the second touch electrodes; and S13 forming a cutting opening in the bridging region, the boundary region and the main body region.

According to the embodiments of the present disclosure, in each touch sensing unit, the bridging region, the boundary region and the main body region all include cutting openings. As a result, when the touch module is used in a touch display device, the Mura phenomenon (or moiré phenomenon) caused by the bridging region, the boundary region and the main body region is eliminated.

Those skilled in the art can understand that the cutting openings in the present disclosure are essentially slits, and the cutting openings can be formed on the first touch electrode and the second touch electrodes using processes such as photolithography and sawing. In addition, the cutting opening and the slit between the first touch electrode and the second touch electrodes may be formed at the same time in the same process step.

In the description of the present disclosure, the orientations or positional relationships indicated by the terms "upper", "lower", etc. are based on the orientations or positional relationships illustrated in the drawings, which are only for the convenience of describing the present disclosure and do not require the present disclosure to be necessarily constructed and operated in a specific orientation, and therefore cannot be understood as a limitation to the present disclosure.

In the description of this specification, the description with reference to the terms "an embodiment", "another embodiment", etc. means that specific features, structures, materials or characteristics described in conjunction with the embodiment are included in at least one embodiment of the present disclosure. In this specification, the schematic representations of the above terms do not necessarily refer to the same embodiment or example. Moreover, the described specific features, structures, materials or characteristics may be combined in any one or more embodiments or examples in a suitable manner. In addition, those skilled in the art may combine different embodiments or examples and the features of the different embodiments or examples described in this specification in the case of causing no conflict. Furthermore, it is to be noted that in this specification, the terms "first" and "second" are only used for descriptive purposes, and cannot be understood as indicating or implying relative importance or implicitly indicating the number of indicated technical features.

What have been stated above are only specific embodiments of the present disclosure, but the protection scope of the present disclosure is not limited thereto. Any variations or substitutions that can be easily conceived by those skilled in the art familiar with this technical field within the technical scope revealed by the present disclosure should be encompassed within the protection scope of the present disclosure. Thus, the protection scope of the present disclosure should be based on the protection scope of the claims.

What is claimed is:

1. A touch module, comprising:
    a base substrate; and
    an array of touch units arranged on the base substrate, each touch unit comprising a first touch electrode extending along a first direction and two second touch electrodes arranged on two sides of the first touch electrode along a second direction, the first direction and the second direction intersecting each other,
    wherein the touch unit further comprises: a bridging region between the two second touch electrodes and comprising a connection portion of the two second touch electrodes, a boundary region between the first touch electrode and each of the second touch electrodes, and a main body region located inside at least one of the first touch electrode and the second touch electrodes, wherein the bridging region, the boundary region and the main body region respectively comprise cutting openings, and wherein the first touch electrode and the second touch electrodes each comprises a metal mesh, and the cutting openings are fractures of metal wires of the metal mesh and are slits.

2. The touch module according to claim 1, wherein the cutting openings in the bridging region, the boundary region and the main body region have a substantially same distribution density.

3. The touch module according to claim 2, wherein a distribution density of the cutting openings in the bridging region is approximately 0.9 to 1.1 times a distribution density of the cutting openings in the main body region.

4. The touch module according to claim 1, wherein a ratio of an area of the bridging region to an area of the touch unit is in a range of approximately 1/10000 to 1/500.

5. A touch module, comprising:
a base substrate; and
an array of touch units arranged on the base substrate, each touch unit comprising a first touch electrode extending along a first direction and two second touch electrodes arranged on two sides of the first touch electrode along a second direction, the first direction and the second direction intersecting each other,
wherein the touch unit further comprises: a bridging region between the two second touch electrodes, a boundary region between the first touch electrode and each of the second touch electrodes, and a main body region located inside at least one of the first touch electrode and the second touch electrodes,
wherein the bridging region, the boundary region and the main body region respectively comprise cutting openings, and
wherein a ratio of a number of sub-pixels covered by the bridging region to a number of sub-pixels covered by the touch unit in a range of approximately $3 \times 10^{-4} \sim 4 \times 10^{-3}$.

6. The touch module according to claim 1, wherein a first dimension of the bridging region in the first direction is larger than a second dimension of the bridging region in the second direction.

7. The touch module according to claim 6, wherein a ratio of the second dimension to the first dimension is in a range of about 0.3 to 1.

8. A touch display device, comprising:
a display panel; and
the touch module according to claim 1, the touch module being arranged on a light exit surface of the display panel.

9. The touch display device according to claim 8, wherein the cutting openings in the bridging region, the boundary region and the main body region have a substantially same distribution density.

10. The touch display device according to claim 9, wherein a distribution density of the cutting openings in the bridging region is approximately 0.9 to 1.1 times a distribution density of the cutting openings in the main body region.

11. The touch display device according to claim 8, wherein a ratio of an area of the bridging region to an area of the touch unit is in a range of approximately 1/10000 to 1/500.

12. A touch display device, comprising:
a display panel; and
the touch module according to claim 5, the touch module being arranged on a light exit surface of the display panel.

13. The touch display device according to claim 8, wherein a first dimension of the bridging region in the first direction is larger than a second dimension of the bridging region in the second direction.

14. The touch display device according to claim 13, wherein a ratio of the second dimension to the first dimension is in a range of about 0.3 to 1.

15. A manufacturing method of a touch module, comprising:
providing a base substrate;
arranging an array of touch units on the base substrate, each touch unit comprising a first touch electrode extending along a first direction and two second touch electrodes arranged on two sides of the first touch electrode along a second direction, the first direction and the second direction intersecting each other; the touch unit further comprising: a bridging region between the two second touch electrodes and comprising a connection portion of the two second touch electrodes, a boundary region between the first touch electrode and each of the second touch electrodes, and a main body region located inside at least one of the first touch electrode and the second touch electrodes; and
forming cutting openings in the bridging region, the boundary region and the main body region,
wherein the first touch electrode and the second touch electrodes each comprises a metal mesh, and forming the cutting openings comprises forming fractures of metal wires of the metal mesh, the cutting openings being slits.

16. The touch module according to claim 2, wherein a ratio of an area of the bridging region to an area of the touch unit is in a range of approximately 1/10000 to 1/500.

17. The touch module according to claim 2, wherein a ratio of a number of sub-pixels covered by the bridging region to a number of sub-pixels covered by the touch unit in a range of approximately $3 \times 10^{-4} \sim 4 \times 10^{-3}$.

18. The touch module according to claim 2, wherein a first dimension of the bridging region in the first direction is larger than a second dimension of the bridging region in the second direction.

19. The touch display device according to claim 9, wherein a ratio of an area of the bridging region to an area of the touch unit is in a range of approximately 1/10000 to 1/500.

20. The touch display device according to claim 9, wherein a ratio of a number of sub-pixels covered by the bridging region to a number of sub-pixels covered by the touch unit in a range of approximately $3 \times 10^{-4} \sim 4 \times 10^{-3}$.

* * * * *